(12) United States Patent
Zhang et al.

(10) Patent No.: US 12,566,743 B2
(45) Date of Patent: Mar. 3, 2026

(54) DATA PROCESSING METHOD AND APPARATUS

(71) Applicant: Cloud Intelligence Assets Holding (Singapore) Private Limited, Singapore (SG)

(72) Inventors: Feng Zhang, Shanghai (CN); Li Xu, Hangzhou (CN); Qiangqiang Wu, Shanghai (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 0 days.

(21) Appl. No.: 18/850,500

(22) PCT Filed: Mar. 24, 2023

(86) PCT No.: PCT/CN2023/083876
§ 371 (c)(1),
(2) Date: Sep. 24, 2024

(87) PCT Pub. No.: WO2023/179784
PCT Pub. Date: Sep. 28, 2023

(65) Prior Publication Data
US 2025/0225116 A1    Jul. 10, 2025

(30) Foreign Application Priority Data
Mar. 25, 2022    (CN) .......................... 202210299496.1

(51) Int. Cl.
*G06F 16/00* (2019.01)
*G06F 16/11* (2019.01)
(Continued)

(52) U.S. Cl.
CPC .......... *G06F 16/2228* (2019.01); *G06F 16/11* (2019.01); *G06F 16/134* (2019.01);
(Continued)

(58) Field of Classification Search
CPC ...... G06F 16/2228; G06F 16/11; G06F 16/14; G06F 16/27; G06F 16/182; G06F 16/164;
(Continued)

(56) References Cited

U.S. PATENT DOCUMENTS

| | | | | |
|---|---|---|---|---|
| 9,104,680 B2 * | 8/2015 | Vanderhallen | .......... | G06F 16/14 |
| 10,255,286 B2 * | 4/2019 | Shankar | ................ | G06F 16/182 |

(Continued)

FOREIGN PATENT DOCUMENTS

| | | |
|---|---|---|
| CN | 109189341 A | 1/2019 |
| CN | 113055448 A | 6/2021 |

(Continued)

OTHER PUBLICATIONS

Wenhao Lv et al., "InfiniFS An Efficient Metadata Service for Large-Scale Distributed Filesystems", This paper is included in the Proceedings of the 20th USENIX Conference on File and Storage Technologies., Feb. 22-24, 2022 • Santa Clara, CA, USA,, pp. 313-328.*

(Continued)

*Primary Examiner* — Srirama Channavajjala
(74) *Attorney, Agent, or Firm* — Volpe Koenig

(57) ABSTRACT

A data processing method and apparatus are disclosed, wherein the data processing method is applied to a metadata management node in a distributed file system, including: determining a directory level of metadata to be processed in a directory tree, and assigning an array identifier to the metadata to be processed based on the directory level; and constructing a metadata management table corresponding to the metadata to be processed based on the array identifier and metadata in the directory tree, and managing the directory tree based on the metadata management table. Dividing of the metadata management table and the directory tree is (Continued)

implemented by means of the data identifier, which can achieve efficient metadata management.

17 Claims, 5 Drawing Sheets

(51) Int. Cl.

| | |
|---|---|
| *G06F 16/13* | (2019.01) |
| *G06F 16/14* | (2019.01) |
| *G06F 16/16* | (2019.01) |
| *G06F 16/182* | (2019.01) |
| *G06F 16/185* | (2019.01) |
| *G06F 16/188* | (2019.01) |
| *G06F 16/22* | (2019.01) |

(52) U.S. Cl.
CPC ............ *G06F 16/14* (2019.01); *G06F 16/148* (2019.01); *G06F 16/164* (2019.01); *G06F 16/182* (2019.01); *G06F 16/185* (2019.01); *G06F 16/188* (2019.01)

(58) Field of Classification Search
CPC .... G06F 16/134; G06F 16/148; G06F 16/178; G06F 16/1734; G06F 16/1858; G06F 16/2379; G06F 16/24552; G06F 3/0604; G06F 3/0643; G06F 16/84; G06F 16/162; G06F 16/172; G06F 16/188
See application file for complete search history.

(56) References Cited

U.S. PATENT DOCUMENTS

| | | | | |
|---|---|---|---|---|
| 10,769,025 | B2 * | 9/2020 | Gupta ................. | G06F 11/1451 |
| 10,942,813 | B2 * | 3/2021 | Pandit .................... | G06F 16/27 |
| 11,106,637 | B2 * | 8/2021 | Cronan ................... | G06F 16/13 |
| 11,301,422 | B2 * | 4/2022 | Sinha ...................... | G06F 16/84 |
| 11,347,696 | B2 * | 5/2022 | Tomar .................. | G06F 16/185 |

| | | | | |
|---|---|---|---|---|
| 2010/0115011 | A1 * | 5/2010 | Callahan ................. | G06F 16/13 707/828 |
| 2011/0153606 | A1 * | 6/2011 | Kim ..................... | G06F 16/1827 707/E17.089 |
| 2012/0151250 | A1 * | 6/2012 | Saika .................... | G06F 16/185 714/E11.073 |
| 2014/0188953 | A1 * | 7/2014 | Lin ........................ | G06F 16/183 707/827 |
| 2016/0140118 | A1 * | 5/2016 | Hasegawa ............. | G06F 16/164 707/756 |
| 2018/0239774 | A1 * | 8/2018 | Hu .......................... | G06F 16/14 |
| 2018/0276268 | A1 * | 9/2018 | Doval ................. | G06F 11/0751 |
| 2019/0087431 | A1 * | 3/2019 | Qiu ......................... | G06F 16/13 |
| 2019/0294710 | A1 * | 9/2019 | Gupta ................... | G06F 3/0688 |
| 2019/0394162 | A1 * | 12/2019 | Chalakov ............ | H04L 67/1097 |
| 2022/0043776 | A1 * | 2/2022 | Okamoto ................ | G06F 16/27 |

FOREIGN PATENT DOCUMENTS

| | | | |
|---|---|---|---|
| CN | 114415971 | A | 4/2022 |
| EP | 2 735 978 | B1 * | 3/2017 |
| WO | WO2009019128 | A1 * | 12/2009 |
| WO | WO 2011002978 | A1 * | 1/2011 |
| WO | WO 2016204790 | A1 * | 12/2016 |
| WO | WO2020190669 | A1 * | 9/2020 |
| WO | WO2023230457 | A1 * | 11/2023 |

OTHER PUBLICATIONS

Yuanning Gao et al., "An End-to-End Learning-Based Metadata Management Approach for Distributed File Systems", IEEE Transactions on Computers ( vol. 71, Issue: 5, May 1, 2022), pp. 1021-1034.*

International Search Report, PCT/CN2023/083876, Jun. 19, 2023.

Chinese Office Action, Chinese Patent Application No. 202210299496.1, May 19, 2022.

Chinese Office Search Report, Chinese Patent Application No. 202210299496.1, May 19, 2022.

* cited by examiner

Determining a directory level of metadata to be processed in a directory tree, and assigning an array identifier to the metadata to be processed based on the directory level

102

Constructing a metadata management table corresponding to the metadata to be processed based on the array identifier and metadata in the directory tree, and managing the directory tree based on the metadata management table

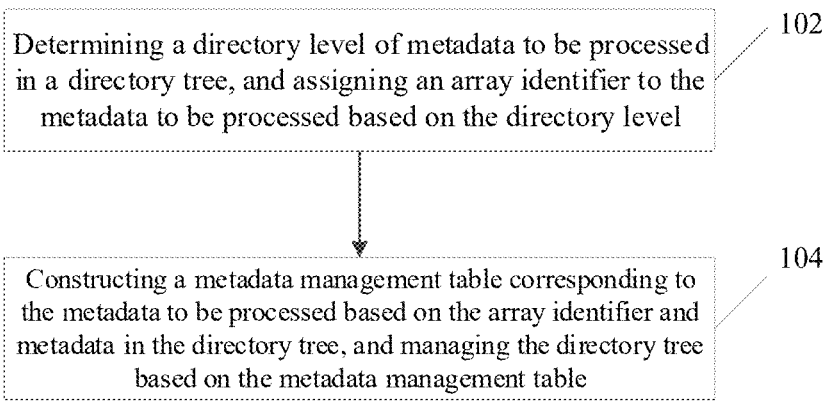

64bit

FIG. 2

DATA PROCESSING METHOD AND APPARATUS

CROSS-REFERENCE TO RELATED APPLICATIONS

The present application claims the priority of the Chinese patent application No. 202210299496.1 filed with the China Patent Office on Mar. 25, 2022, entitled "Data Processing Method and Apparatus", which is incorporated by reference in the present application in its entirety.

TECHNICAL FIELD

Embodiments of the present specification relate to the field of computer technology, and in particular, to a data processing method.

BACKGROUND

A file system needs to manage a large amount of metadata, including a directory and directory entries, file attributes and file data layout, file locks or file range locks, etc. As the size of the file system (number of files, storage capacity) expands, the size of metadata also grows exponentially. A single metadata node (MDS) is no longer capable of handling metadata management and becomes a bottleneck of the system. Currently, in a management solution using multiple metadata nodes, metadata is managed by segmentation and dividing. However, due to the characteristics of directory tree management of the file system, in the process of performing operations on a large amount of metadata, it is impossible to provide efficient metadata access and flexible interface for metadata modification, which affects the efficiency of metadata management of the file system.

SUMMARY

In view of the above, embodiments of the present specification provide a data processing method. One or more embodiments of the present specification simultaneously relate to a data processing apparatus, a computing device, a computer-readable storage medium, and a computer program to solve the technical defects existing in the prior art.

According to a first aspect of the embodiments of the present specification, there is provided a data processing method, applied to a metadata management node in a distributed file system, including:

determining a directory level of metadata to be processed in a directory tree, and assigning an array identifier to the metadata to be processed based on the directory level; and constructing a metadata management table corresponding to the metadata to be processed based on the array identifier and metadata in the directory tree, and managing the directory tree based on the metadata management table.

According to a second aspect of the embodiments of the present specification, there is provided a data processing apparatus applied to a metadata management node in a distributed file system, including:

an identifier assignation module, configured for determining a directory level of metadata to be processed in a directory tree, and assigning an array identifier to the metadata to be processed based on the directory level; and a data management module, configured for constructing a metadata management table corresponding to the metadata to be processed based on the array identifier and metadata in the directory tree, and managing the directory tree based on the metadata management table.

According to a third aspect of the embodiments of the present specification, there is provided a computing device, including:

a memory and a processor;

wherein the memory is used to store computer-executable instructions, and the processor is used to execute the computer-executable instructions which, when executed by the processor, implement steps of the above data processing method.

According to a fourth aspect of the embodiments of the present specification, there is provided a computer-readable storage medium having computer-executable instructions stored thereon which, when executed by a processor, implement steps of the above data processing method.

According to a fifth aspect of the embodiments of the present specification, there is provided a computer program, wherein the computer program, when executed in a computer, causes the computer to perform steps of the above data processing method.

A data processing method provided in an embodiment of the present specification is applied to a metadata management node in a distributed file system, including: determining a directory level of metadata to be processed in a directory tree, and assigning an array identifier to the metadata to be processed based on the directory level; and constructing a metadata management table corresponding to the metadata to be processed based on the array identifier and metadata in the directory tree, and managing the directory tree based on the metadata management table.

Specifically, the data processing method provided in the embodiments of the present specification introduces the concept of array identifiers by assigning a corresponding data identifier to metadata according to a directory level of the metadata in a directory tree in a management node of a distributed file system, and then constructing a metadata management table and the directory tree according to the data identifier to achieve metadata management. In the process of performing operations on metadata, the metadata management table and the directory tree are divided through the data identifiers, which can efficiently achieve metadata management. At the same time, in the process of modifying the metadata, the array identifiers may also be used to determine a directory tree that needs to be modified, thereby enabling flexible modification and adjustment of the directory tree, and also improving the metadata management efficiency of the entire distributed file system.

BRIEF DESCRIPTION OF THE DRAWINGS

FIG. 1 is a flow chart of a data processing method provided in an embodiment of the present specification;

FIG. 2 is a schematic structural diagram of an array identifier designed in a data processing method provided in an embodiment of the present specification;

DETAILED DESCRIPTION

Figure 3:
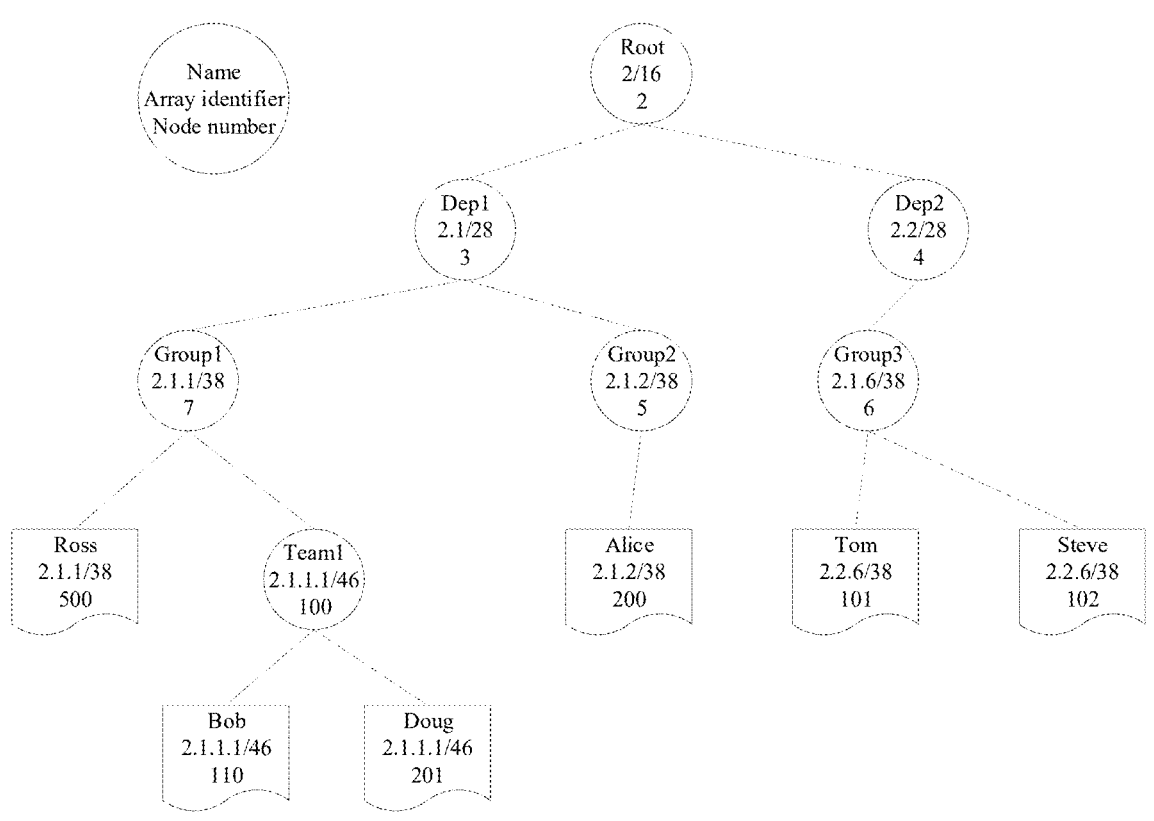
FIG. 3 is a schematic structural diagram of a directory tree constructed based on array identifiers in a data processing method provided in an embodiment of the present specification.

In the following description, many specific details are set forth in order to provide a thorough understanding of the present specification. However, the present specification may be implemented in many other ways than those described herein, and those skilled in the art may make similar extensions without violating the connotation of the present specification. Therefore, the present specification is not limited to the specific implementations disclosed below.

The terms used in one or more embodiments of the present specification are for the purpose of describing specific embodiments only and are not intended to limit the one or more embodiments of the present specification. As used in one or more embodiments of the present specification and the appended claims, the singular forms "a/an . . . ," "said . . . ," and "the . . . " are intended to include the plural forms as well, unless the context clearly indicates otherwise. It should also be understood that the term "and/or" used in one or more embodiments of the present specification refers to and includes any or all possible combinations of one or more associated listed items.

It should be understood that although the terms "first", "second", etc. may be used to describe various information in one or more embodiments of the present specification, the information should not be limited to these terms. These terms are used only to distinguish information of the same type from one another. For example, the first may be referred to as the second, and similarly, the second may be referred to as the first, without departing from the scope of one or more embodiments of the present specification. The word "if" as used herein may be interpreted as "when" or "as" or "in response to determining," depending on the context.

First, the terms involved in one or more embodiments of the present specification are explained.

File system/file management system: a method and a data structure used by an operating system to identify files on storage devices (commonly disks, but also solid-state drives based on NAND Flash) or partitions. That is, a software organization in an operating system that is responsible for managing and storing file information is called a file management system.

Directory entry: it is used to describe attributes, size, creation time, modification time and other information of a file or folder.

KV/Table: a system that manages data using key values or tables.

Inode (information node): a single entity node (file, directory, etc.) in a file system.

Metadata: also known as intermediary data or relay data, which is data about data, mainly information describing data properties, used to support functions such as indicating storage location, historical data, resource search, and file records.

MDS (MetaData Server, metadata management node): a node that manages metadata in a distributed file system.

DirEnt (directory entry in the file system): a structure used to describe directory entries in a LINUX system.

A general file system needs to manage a large amount of metadata, including directories and directory entries, file attributes and file data layout, file locks or file range locks, etc. As the size of the file system (number of files, storage capacity) expands, the size of metadata also grows exponentially. A single metadata node (MDS) is no longer capable of handling metadata management and becomes a bottleneck of the system.

As a response, multiple metadata management nodes (MDS) are generally used to support scenarios with large data volumes. In multiple metadata nodes (MDS) solutions, most of the solutions divide and schedule metadata slices (e.g., hashing based on file paths or node entity identifiers), those hashed so the same files and directories are managed by a certain MDS. However, the file system naturally has the characteristics of directory tree management. Hash-based solutions have many limitations in scenarios such as supporting nested subtrees (how to assign a complete directory subtree to one MDS for management to avoid cross-MDS transaction management), directory move (such as rename) (hash value changes lead to a large amount of metadata migration, or the hash value is kept unchanged but the directory subtree metadata is no longer aggregated in a single MDS), load balancing of different directories (multiple directories hashed to a specific MDS are called hotspots, which will cause a large load in one MDS while other MDSs are very idle).

Ceph proposes a management solution based on directory subtrees, but it relies heavily on its own client CephFSClient to participate in metadata management, and maintaining a large amount of metadata cache between CephFSClient and MDS to cope with file system operations (such as lookup, creation and deletion, etc.) to meet acceptable performance. In addition, Ceph's sub-directory scheduling is an extremely complex process, and the engineering implementation is very difficult.

Based on the above, the embodiments of the present specification propose a solution for managing (segmenting, scheduling) directory subtrees. Metadata management is implemented based on KV/Table. The key point of metadata design is to dynamically match metadata of a directory subtree with partitions of KV/Table by designing array identifiers (hot directories are divided to correspond to partition splits, and directory moves corresponding partition splits and then being rescheduled). When dealing with scenarios such as directory move and directory-level load balancing scheduling, the affinity of the directory tree metadata can be well maintained (that is, the metadata of the same directory subtree is managed by one MDS), so that in most cases, various file system operations (creation, deletion, reading and writing, etc.) do not require distributed transactions across multiple MDSs, and have better performance.

A data processing method is provided in the present specification. The present specification also relates to a data processing apparatus, a computing device, and a computer-readable storage medium, which are described in detail one by one in the following embodiments.

Referring to FIG. 1, FIG. 1 shows a flow chart of a data processing method provided in an embodiment of the present specification, which specifically includes the following steps.

It should be noted that the data processing method provided in the embodiments of the present specification is applied to a metadata management node in a distributed file system, and there may be multiple metadata management nodes in the distributed file system to achieve metadata segmenting and scheduling. The number of metadata management nodes are not limited in the present embodiment.

Step 102: determining a directory level of metadata to be processed in a directory tree, and assigning an array identifier to the metadata to be processed based on the directory level.

The metadata to be processed may be understood as metadata that needs to perform operations such as writing, updating, etc. in the distributed file system, including a directory name, a directory attribute, etc. The directory level may be understood as a level at which a directory is located when a user creates the directory or writes metadata. For example, if the user writes metadata at the first level of the directory, the directory level may be determined to be the first level.

The array identifier may be understood as an identifier (i.e., GroupID) assigned to the metadata according to the directory level, or it may be understood as an identifier corresponding to a node of a certain directory level in a directory tree. For example, if the node of the first directory level in the directory tree is A, a corresponding identifier AI may be assigned to node A in the directory tree to represent node A in the directory tree.

In actual applications, during the process of managing metadata to be processed, a metadata management node in a distributed file system may assign an array identifier for metadata to be processed as a management component of the metadata to be processed (the component may be understood as a key in a metadata management table), and subsequently manage the metadata based on the assigned array identifier. Specifically, the metadata management node may first determine the directory level of the metadata to be processed in the directory tree, and assign the corresponding array identifier for the metadata to be processed according to the directory level.

Specifically, assigning the array identifier to the metadata to be processed based on the directory level includes:

determining a field level of the metadata to be processed based on the directory level, and assigning the array identifier for the metadata to be processed based on the field level and a preset array field.

The field level may be understood as a field level that the array identifier determined for the directory level may occupy. For example, if the directory level of the metadata to be processed is determined to be the second level, the corresponding array field of the metadata to be processed occupies the first two field levels. If the directory level of the metadata to be processed is determined to be the third level, the corresponding array field of the metadata to be processed may occupy the first three field levels.

In actual applications, the metadata management node first determines the field level of the metadata to be processed based on the directory level where the metadata to be processed is written, and then determines what kind of array identifier to assign to the metadata to be processed based on the preset array field and the field level. It should be noted that the preset array field may be understood as the number of all fields designed for GroupID. For example, GroupID is designed to be a unit64 number, which may be segmented into multiple fields in accordance with the file system directory level. Please refer to FIG. 2 for details. FIG. 2 shows a schematic structural diagram of an array identifier designed in a data processing method provided in an embodiment of the present specification.

FIG. 2 is a schematic diagram of an array identifier, i.e., the field design of GroupID. The figure shows that GroupID is a 64-bit number, wherein each grid in FIG. 2 may represent a field, and may contain 8 fields, and each field corresponds to a directory level. For example, from left to right in FIG. 2, the first field corresponds to the first-level directory, the second field corresponds to the second-level directory, the third field corresponds to the third-level directory, and so on. It should be noted that the present embodiment only explains by taking GroupID as 64 bits and divided into 8 fields as an example. In actual applications, there is no limitation on the specific number of bytes and fields.

In addition, different data volume sizes, that is, the number of bits, may be designed for each field in the array identifier. For example, a segmentation method for GroupID is shown in Table 1 below:

TABLE 1

| First level | 16 bits |
|---|---|
| Second level | 12 bits |
| Third level | 10 bits |
| Fourth level | 8 bits |
| Fifth level | 4 bits |
| Sixth level | 4 bits |
| Seventh level | 4 bits |
| Eighth level | 4 bits |

Based on the above, when creating a directory or file, in addition to assigning a directory tree node, it is also necessary to associate a GroupID. The rule to follow may be: if a new file is created, the new file is equal to the GroupID of the parent directory. If a new directory is created, on the basis of copying the parent directory's GroupID, a field corresponding to the level of the new directory in the current directory tree is assigned. For example, assuming that eight levels corresponding to the eight fields of GroupID are recorded in the form of a. b. c. d. e. f. g. h, i.e., there are eight levels in total, then, for a directory, according to the level corresponding to the directory, only the field corresponding to the level need to be assigned, and subsequent fields will be reserved for the subdirectories (the directories at the next level) and sub-subdirectories (the directories at the further next level). Therefore, for a directory under the root directory (the first-level directory), the GroupID should be 1.0.0.0.0.0.0.0 or 2.0.0.0.0.0.0.0; furthermore, for the second-level directory, the GroupID should be 2.1.0.0.0.0.0.0 or 2.2.0.0.0.0.0.0.

The data processing method provided in the embodiments of the present specification determines the field level of the metadata to be processed and creates the corresponding array identifier for the metadata to be processed according to the field format for pre-designing array identifier, so that the metadata to be processed is not only provided with a directory level, but also may be associated with an array identifier, which is convenient for subsequent unified management of the metadata in units of directory subtrees based on the array identifier.

In addition, after determining the array identifier of the metadata to be processed, the metadata management node may also abbreviate the array identifier according to a certain rule, so that the metadata may be managed based on the abbreviated array identifier in the future, reducing the complexity of computer processing. Specifically, after assigning the array identifier for the metadata to be processed based on the field level, the method also includes:

determining a total number of bytes of the preset array field, and determining a number of level bytes corresponding to the field level based on the total number of bytes; and abbreviating the array identifier based on the number of level bytes to obtain an abbreviated array identifier of the array identifier.

In actual applications, since the number of bytes of each field in the preset array field may be the same or different, the metadata management node may first determine the total number of bytes of the preset array field, and determine the number of level bytes corresponding to each field level based on the total number of bytes, and then abbreviate the array identifier based on the number of level bytes, and finally obtain the abbreviated array identifier corresponding to the array identifier. It should be noted that the above abbreviation processing process may refer to the IP/Net-Mask method.

For example, from an array identifier of GroupID 1.0.0.0.0.0.0.0, it may be determined that the GroupID is the array identifier assigned under the first-level directory, and the first level of the GroupID, that is, the first field, contains numbers, and the other fields are 0. Since the data volume size occupied by the first-level field designed in the above Table 1 is 16 bits, the GroupID of 1.0.0.0.0.0.0.0 may be abbreviated as 1/16. Since the data volume size occupied by the first-level field designed in the above Table 1 is 16 bits, and the data volume size occupied by the second-level field is 12 bits, the GroupID of 2.1.0.0.0.0.0.0 may be abbreviated as 2.1/28, and so on. The data processing method provided in the embodiments of the present specification may all abbreviate array identifiers; the specific abbreviation method is not limited here.

The data processing method provided in the embodiments of the present specification can greatly increase the computing efficiency of the computer by abbreviating the array identifier assigned to the metadata to be processed, and facilitate the subsequent construction of a metadata management table based on the abbreviated array identifier and the management of the directory tree.

Step 104: constructing a metadata management table corresponding to the metadata to be processed based on the array identifier and metadata in the directory tree, and managing the directory tree based on the metadata management table.

The metadata management table may be understood as implementing management of metadata, and implementing management and scheduling of metadata at sub-directory granularity in the file system.

In actual applications, after determining the array identifier corresponding to the metadata to be processed, the metadata management node may directly construct a metadata management table based on metadata in the directory tree and the array identifier, wherein the metadata management table contains the array identifier and metadata having the same type as the metadata to be processed, and then the directory tree is managed according to the constructed metadata management table.

Furthermore, constructing the metadata management table corresponding to the metadata to be processed based on the array identifier and the metadata in the directory tree includes:

determining, from the metadata in the directory tree, metadata having the same data type as the metadata to be processed; and constructing the metadata management table corresponding to the metadata to be processed based on the array identifier and the metadata having the same data type.

In actual applications, in the process of constructing a metadata management table, different types of metadata may be placed in different types of metadata management tables for management. Therefore, it is necessary to determine metadata having the same data type as the metadata to be processed from the metadata in the directory tree, and then construct a metadata management table corresponding to the metadata to be processed based on the array identifier assigned to the metadata to be processed and the metadata of the same type determined from the directory tree.

It should be noted that the metadata of the file system is constructed on the Table. The most common directory entry (DirEnt) and file metadata (InodeAttr) tables of the file system are used as examples for introduction. Other metadata are similar. For a directory entry table, please refer to Table 2 below:

TABLE 2

| GroupID (Unit64) | DirInode (Unit64) | EntryName (String) | ChildInode (Unit64) | ChildGroupID (Unit64) |
|---|---|---|---|---|
| *** | *** | *** | *** | *** |

For file metadata, please refer to Table 3 below:

TABLE 3

| ParentDirGroupID (Unit64) | Inode (Unit64) | Attrs |
|---|---|---|
| *** | *** | *** |

It can be seen from Tables 2 and 3 above that in each metadata management table, GroupID is used as a primary key in the management table to construct the entire metadata management table. GroupID is to correlate Table splitting/merging with logical subtrees of the file system. In a case where the subtree structure changes (especially in the rename scenario), scheduling according to subtrees can be easily achieved without data migration or modification of a large number of keys.

The data processing method provided in the embodiments of the present specification selects metadata having the same type as the metadata to be processed to construct a metadata management table, so as to realize the construction of different types of metadata management tables, thereby achieving more effective management and scheduling of metadata.

Furthermore, the data processing method provided in the embodiments of the present specification is described by taking a directory entry table and a file list attribute metadata table as examples, wherein corresponding GroupID in the directory entry table and metadata corresponding to directory entries may be seen in Table 4 below:

TABLE 4

| GroupID (Unit64) | DirInode (Unit64) | EntryName (String) | ChildInode (Unit64) | ChildGroupID (Unit64) |
|---|---|---|---|---|
| 1/16 | 1 | / | 2 | 2/16 |
| 2/16 | 2 | dep1 | 3 | 2.1/28 |
| 2/16 | 2 | dep2 | 4 | 2.2/28 |
| 2.1/28 | 3 | group1 | 7 | 2.1.1/38 |
| 2.1/28 | 3 | group2 | 5 | 2.1.2/38 |

TABLE 4-continued

| GroupID (Unit64) | DirInode (Unit64) | EntryName (String) | ChildInode (Unit64) | ChildGroupID (Unit64) |
|---|---|---|---|---|
| 2.1.1/38 | 7 | Ross | 500 | — |
| 2.1.1/38 | 7 | team1 | 100 | 2.1.1.1/46 |
| 2.1.1.1/46 | 100 | Bob | 110 | — |
| 2.1.1.1/46 | 100 | Doug | 201 | — |
| 2.1.2/38 | 5 | Alice | 200 | — |
| 2.2/28 | 4 | group3 | 6 | 2.2.6/38 |
| 2.2.6/38 | 6 | Tom | 101 | — |
| 2.2.6/38 | 6 | Steve | 102 | — |

GroupID and corresponding metadata in the file list attribute metadata table may be found in Table 5 below:

TABLE 5

| DirGroupID (Unit64) | Inode (Unit64) | Attrs |
|---|---|---|
| 2/16 | 2 | |
| 2.1/28 | 3 | |
| 2.1.1/38 | 7 | |
| 2.1.1/38 | 500 | |
| 2.1.1.1/46 | 100 | |
| 2.1.1.1/46 | 110 | |
| 2.1.1.1/46 | 201 | |
| 2.1.2/38 | 5 | |
| 2.1.2/38 | 200 | |
| 2.2/28 | 4 | |
| 2.2.6/38 | 6 | |
| 2.2.6/38 | 101 | |
| 2.2.6/38 | 102 | |

The directory tree may be constructed based on the construction of the metadata management table in Tables 4 and 5 above, and it may also be constructed based on array identifiers. For details, please refer to FIG. 3, which shows a schematic structural diagram of a directory tree constructed based on array identifiers in a data processing method provided in an embodiment of the present specification.

Each node in FIG. 3 includes a node name, an array identifier, and a node number. For example, the top node (first-level node) in FIG. 3 includes a name of root, an array identifier of 2/16 (array abbreviation identifier), and a node number of 2. Furthermore, there are two child nodes (second-level nodes) under the root node, the first one of which has a name of Dep1, an array identifier of 2.1/28, and a node number of 3, and the second one of which has a name of Dep2, an array identifier of 2.2/28, and a node number of 4. Furthermore, child nodes under the Dep1 node are Group1 and Group2, respectively, and the array identifier corresponding to the Group1 node is 2.1.1/38 and the node number is 7, while the array identifier corresponding to the Group2 node is 2.1.2/38 and the node number is 5. A child node under the Dep2 node is Group3, and the array identifier corresponding to the Group3 node is 2.2.6/38. In addition, the Group1 node also includes a Ross node with an array identifier of 2.1.1/38 and a node number of 500, and a Team1 node with an array identifier of 2.1.1.1/46 and a node number of 100. Furthermore, corresponding child nodes under the Team1 node include the Bob node and the Doug node, and the array identifier corresponding to the Bob node is 2.1.1.1/46 and the node number is 110, while the array identifier corresponding to the Doug node is 2.1.1.1/46 and the node number is 201. The Group2 node includes an Alice node with an array identifier of 2.1.2/38 and a node number of 200. The Group3 node includes a Tom node with an array identifier of 2.2.6/38 and a node number of 101 and a Steve node with an array identifier of 2.2.6/38 and a node number of 102.

In summary, after the metadata management node introduces the concept of GroupID, both the metadata management table and the directory tree created may use GroupID as the primary key to implement metadata management. It should be noted that metadata in a directory tree may be matched one-to-one with metadata in a metadata management table, so that subsequent file system operations only need to be based on the operation handle (containing GroupID) to achieve management and scheduling of the metadata in the directory tree.

Furthermore, as the data volume continues to increase dramatically, the data volume of metadata is also increasing massively. Therefore, in a case where metadata in a metadata management table is too large, splitting processing may be performed, which may be reflected not only in the splitting of the metadata management table, but also in the splitting of a directory tree, thereby ensuring the one-to-one correspondence between the table and the tree, and meanwhile the metadata can be managed quickly without performing a large amount of data modifications and migrations. Specifically, managing the directory tree based on the metadata management table includes:

in a case where it is determined that data in the metadata management table meets a preset splitting condition, splitting the metadata management table based on the array identifier, and segmenting the directory tree where the metadata to be processed is located based on a split result.

The preset splitting condition may be understood as a condition that triggers the splitting of the metadata management table, such as the large amount of metadata in the metadata management table, the high frequency or popularity of data access of metadata, etc. The triggering condition of the splitting operation in the embodiments of the present specification are not limited here.

In actual applications, in a case where a metadata management node in a distributed file system meets the preset splitting condition, the metadata management node may perform the data splitting operation. Specifically, the metadata management node may split the metadata management table based on the array identifier recorded in the metadata management table. The principle of splitting is based on the array identifier, that is, it may be understood that array identifiers of the same level may be managed by the same metadata management node via splitting. For example, for metadata in Table 4 above, the splitting processing may be performed with reference to GroupID. From top to bottom in Table 4, starting from GroupID 1/16 to GroupID 2.1.2/38, metadata corresponding to this part of array identifiers is segmented into a first part, and metadata corresponding to the remaining array identifiers in Table 4 is taken as the second part. Furthermore, after the metadata management table is split, thanks to the above one-to-one correspondence between the metadata management table and the directory tree structure, the directory tree where the metadata to be processed is located is automatically segmented.

In addition, in addition to the split operation triggered by the metadata management node in a case where the preset split condition is met, the metadata management table may also be split according to requirements input by a user, thereby realizing the segmentation of the directory tree. Specifically, managing the directory tree based on the metadata management table includes: receiving a splitting execution instruction for the metadata management table, in response to the splitting execution instruction, splitting the metadata management table based on the array identifier, and segmenting the directory tree where the metadata to be processed is located based on a split result.

In actual applications, the metadata management node may also receive a split execution instruction for metadata under an operation and maintenance requirement or a monitoring execution condition, then may split the metadata management table in response to the split execution instruction. Similarly, splitting of the metadata management table is implemented based on the GroupID recorded in the metadata management table, and then the directory tree is segmented according to a split result.

The data processing method provided in the embodiments of the present specification realizes the splitting and management of metadata through array identifiers in the metadata management table. The splitting operation is not only simple and fast, but also can realize the correlation management of the logical directory tree structure and the metadata management table. Since multiple management nodes may be provided in the distributed file system to manage metadata, after the metadata in the metadata management table is split or the metadata in the directory tree is segmented, a part of the split metadata may be directly scheduled to another management node for management to support the function of multiple management node scheduling. Specifically, after segmenting the directory tree based on the split result, the method also includes:

determining a segmentation array identifier of the directory tree;

assigning all sub-directory trees under the segmentation array identifier to another management node, except the metadata management node, in the distributed file system for management.

The segmentation array identifier may be understood as a array identifier at which splitting is performed in the metadata management table. For example, in the above Table 4, the split array identifier is 2.2/28.

In actual applications, after determining the segmentation array identifier to be split, the metadata management node may split the sub-directory tree part under the segmentation array identifier from the directory tree, and assign them to another management node in the distributed system except the original metadata management node for management. For example, the sub-directory trees part of the directory tree where the sub-directory nodes under the array identifier 2.2/28 are located may be directly assigned to another metadata management node for management.

Specifically, since the directory tree forms a B+ tree according to GroupID, and GroupID is also the prefix of the primary key in the metadata management table, the segmentation of the B+ tree and the splitting of the table may be matched one by one. Furthermore, an initial state may be understood as that the entire root directory is in one part and managed by one MDS. Once the split or segmentation is performed, two sub-directory trees may be managed separately (for example, because one of the directory trees becomes hot data), the two sub-directory trees after the segmentation are managed by two MDSs.

Figure 4:
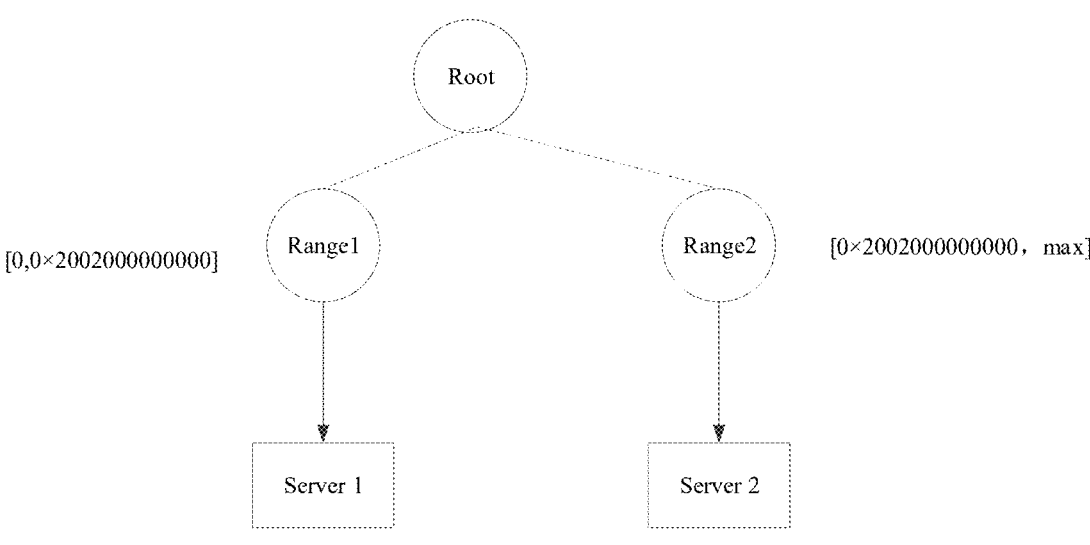
FIG. 4 is a schematic diagram of scheduling after directory tree segmentation in a data processing method provided in an embodiment of the present specification.

The following may refer to FIG. 4, which shows a schematic diagram of scheduling after directory tree segmentation in a data processing method provided in an embodiment of the present specification.

In FIG. 4, there are two parts under the root node. One part is a node cluster composed of Range1 on the left, and the other part is a node cluster composed of Range2 on the right. Correspondingly, the directory tree under Range1 is managed by Server 1, and the directory tree under Range2 is managed by Server 2. For ease of understanding, binary is adopted for representation. If the range of the array identifiers corresponding to Range1 is [0, 0x2002000000000], the range of the array identifiers corresponding to Range2 is [0x2002000000000, max].

The data processing method provided in the embodiments of the present specification may schedule, based on the determined segmentation array identifier, the metadata corresponding to the partition array identifier to another management node for management, so as to realize metadata management by different servers and reduce the pressure on the original server.

Furthermore, the data processing method provided in the embodiments of the present specification not only realizes management of metadata by introducing the concept of array identifiers. Based on the metadata management table and the directory tree constructed by the array identifiers, the present solution may also support a more complex directory move (rename) in the file system operations, and may continue to maintain the locality of the entire directory subtree after rename. Specifically, managing the directory tree based on the metadata management table includes:

receiving a directory move instruction for a sub-directory tree under the array identifier; and in response to the directory move instruction, moving the sub-directory tree to a target array position carried in the directory move instruction, wherein a management node corresponding to the target array position is different from the management node corresponding to the sub-directory tree.

In actual applications, after receiving the directory move instruction for the sub-directory tree under the array identifier, the metadata management node may move the sub-directory tree to the target array position carried in the directory move instruction in response to the directory move instruction, wherein the sub-directory tree may be moved in the same management node or in different management nodes to support cross-node and non-cross-node renames. For details, please refer to FIG. 5, which shows a schematic structural diagram of directory move in a data processing method provided in an embodiment of the present specification.

Figure 5:
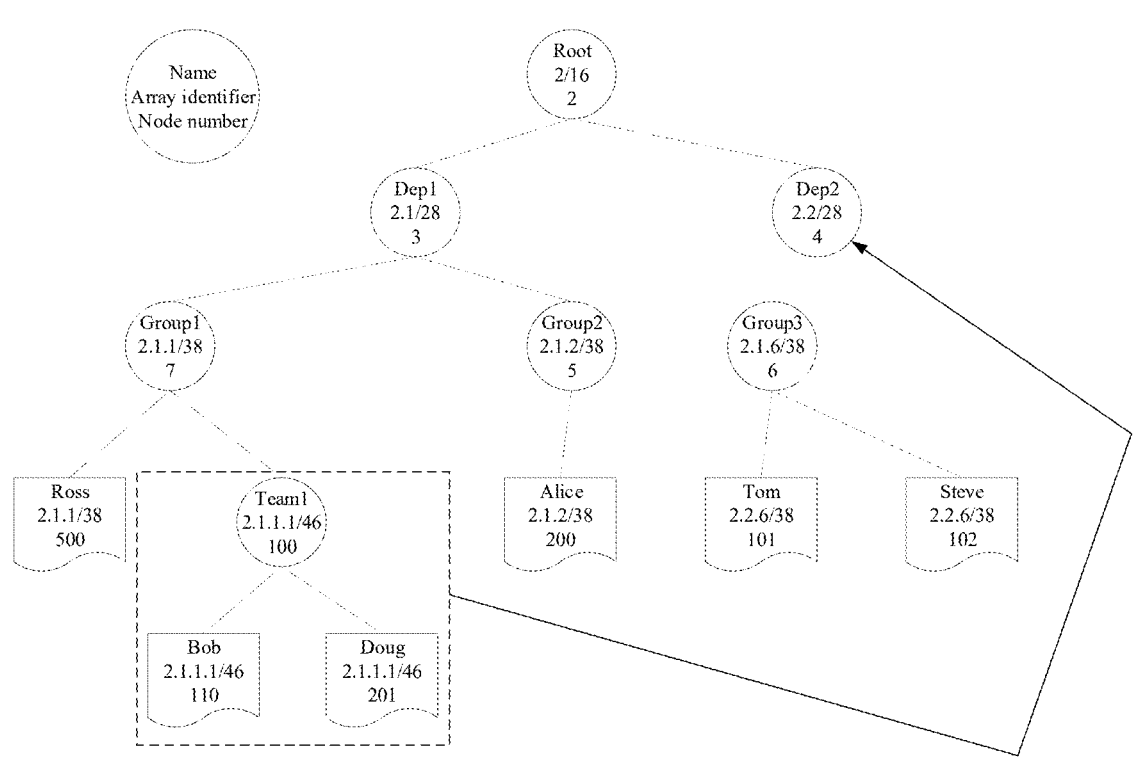
FIG. 5 is a schematic structural diagram of directory move in a data processing method provided in an embodiment of the present specification.

The structure of the directory tree in FIG. 5 is consistent with the structure of the directory tree in FIG. 3 above, and the specific structure will not be repeated here. Taking the movement of the Team1 directory to the Dep2 directory as an example, as shown in FIG. 5, sub-directory trees under the Team1 node in the dotted box are moved to the Dep2 node, and the directory move may be completed only based on the array identifier.

Furthermore, after the directory move of each sub-directory tree in the directory tree is completed, the metadata management table may also be changed and adjusted at the same time. Specifically, after moving the sub-directory tree to the target array position carried in the directory move instruction, the method also includes:

updating the metadata management table based on a move result, wherein the array identifier in the move result remains unchanged during update process.

In actual applications, the metadata management node re-updates the metadata in the metadata management table based on a move result of moving the sub-directory tree, so that the order of the array identifiers in the metadata management table is consistent with the order of the metadata in the directory tree after the move, and a one-to-one correspondence is maintained and achieved.

It should be noted that, in the method provided in the embodiment of the present specification, in order to ensure the invariance of the file handle accessed by the file system, no modification is made to the array identifier of the moved sub-directory tree, and the directory tree after the move still maintains affinity. For example, As mentioned above, in FIG. 5, the Team1 directory is moved to the Dep2 directory, so that under the array identifier of 2.2/28, the sub-directory tree corresponding to the array identifier of 2.1.1.1/46 may be directly connected. Although under the general rule, the node with the array identifier of 2.2/28 is connected to directory trees at the same level as the node, or connected to corresponding sub-directory trees, but in the present solution, it is possible to support the connection of directory trees corresponding to different array levels without modifying the moved array identifier.

Specifically, the metadata management table after the directory move processing may be seen in Table 6 below:

TABLE 6

| GroupID (Unit64) | DirInode (Unit64) | EntryName (String) | ChildInode (Unit64) | ChildGroupID (Unit64) |
|---|---|---|---|---|
| 1/16 | 1 | / | 2 | 2/16 |
| 2/16 | 2 | dep1 | 3 | 2.1/28 |
| 2/16 | 2 | dep2 | 4 | 2.2/28 |
| 2.1/28 | 3 | group1 | 7 | 2.1.1/38 |
| 2.1/28 | 3 | group2 | 5 | 2.1.2/38 |
| 2.1.1/38 | 7 | Ross | 500 | — |
| 2.1.1/38 (Delete whole row) | 7 | team1 | 100 | 2.1.1.1/46 |
| 2.1.1.1/46 | 100 | Bob | 110 | — |
| 2.1.1.1/46 | 100 | Doug | 201 | — |
| 2.1.2/38 | 5 | Alice | 200 | — |
| 2.2/28 | 4 | group3 | 6 | 2.2.6/38 |
| 2.2/28 (Add whole row) | 4 | Team1 | 100 | 2.1.1.1/46 |
| 2.2.6/38 | 6 | Tom | 101 | — |
| 2.2.6/38 | 6 | Steve | 102 | — |

It should be noted that the present solution introduces the concept of GroupID to construct a metadata management table and a directory tree, so as to facilitate splitting, merging and correlating, support distributed file system metadata management (segmentation and scheduling) according to directory trees. Meanwhile, the locality of metadata of a directory tree at MDS level is well maintained. Even after the directory is moved, the locality of the directory subtree can still be achieved (this locality means that directory subtrees at different levels may also be connected according to array identifiers).

In addition, in order to enhance the locality of the Dep2 directory subtree in FIG. 5 above, the subtree of Team1 may be scheduled to the same MDS as Dep2 by scheduling subtables and sub-directory trees in the metadata management table. Subsequent operations on this subtree will not involve distributed transaction operations across MDSs. For details, please refer to FIG. 6, which shows a schematic diagram of directory subtree scheduling after directory move in a data processing method provided in an embodiment of the present specification.

Figure 6:
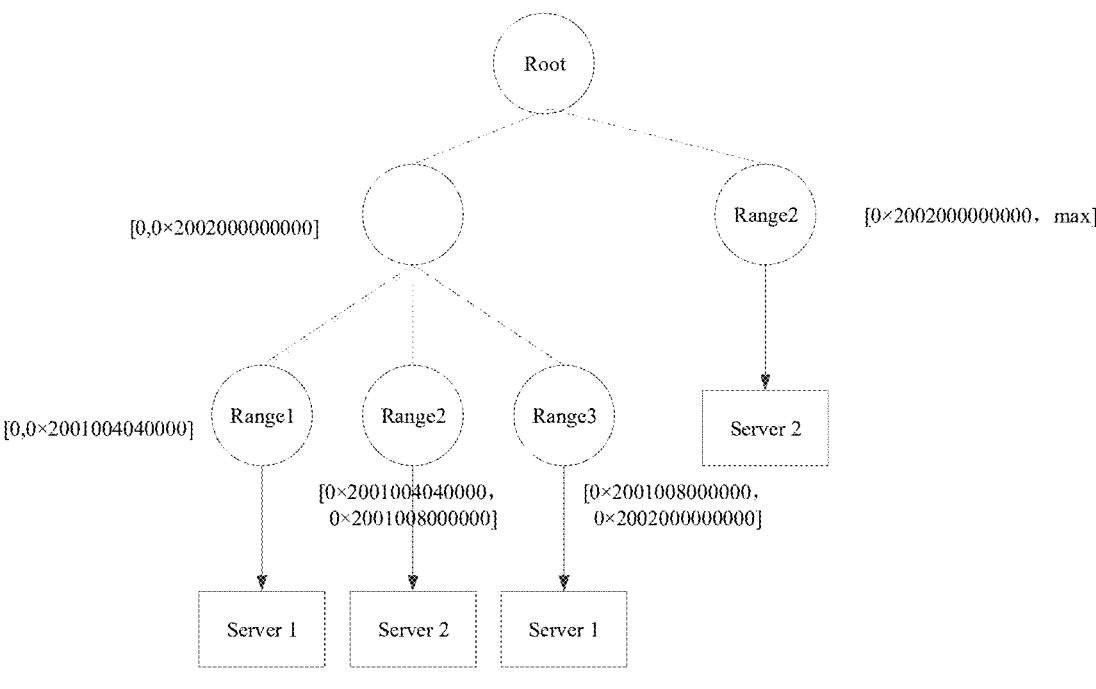
FIG. 6 is a schematic diagram of directory subtree scheduling after directory move in a data processing method provided in an embodiment of the present specification.

The overall structure shown in FIG. 6 is similar to the structure in FIG. 4. The node at the same position as Range1 in FIG. 4 may be further divided into three nodes, namely range1, range2 and range3, and the corresponding array identifier ranges are respectively: [0, 0x2001004040000], [0x2001004040000, 0x2001008000000], [0x200100800000, 0x2002000000000]; wherein metadata corresponding to the range1 node is managed by server 1, metadata corresponding to the range2 node is managed by server 2, and metadata corresponding to the range3 node is managed by server 1. It should be noted that the range2 node is also managed by server 1 before the directory move is executed. And after the directory move is executed, the metadata directory subtree corresponding to the range2 node may be managed by server 2. At the same time, there is another range2 node in the right sub-directory node under the root node in FIG. 6, the corresponding array identifier range is [0x2002000000000, max], and all sub-directory trees under this range2 are managed by server 2.

Based on the above, the directory tree constructed based on the array identifier may support to schedule the sub-directory tree after directory move to another server for management. The file system does not require the client to participate in the management of metadata, but can also relieve certain management pressure for the same server, which has advantages in performance and management flexibility.

In summary, in the data processing method provided in the embodiments of the present specification, on the basis of the Table-based file system metadata management method, by introducing the concept of GroupID, the structural expression of the file system directory and the underlying partition expression based on Table are matched one by one. The file system operation can locate the MDS corresponding to metadata at the first time, only based on the current operation handle (GroupID) and in combination with the current scheduling status of the partition, so as to realize the splitting, merging and correlation of the logical directory structure and the metadata management table, support distributed file system metadata management according to directory tree, and at the same time can well maintain the locality of the metadata of a directory tree at the MDS level.

Figure 7:
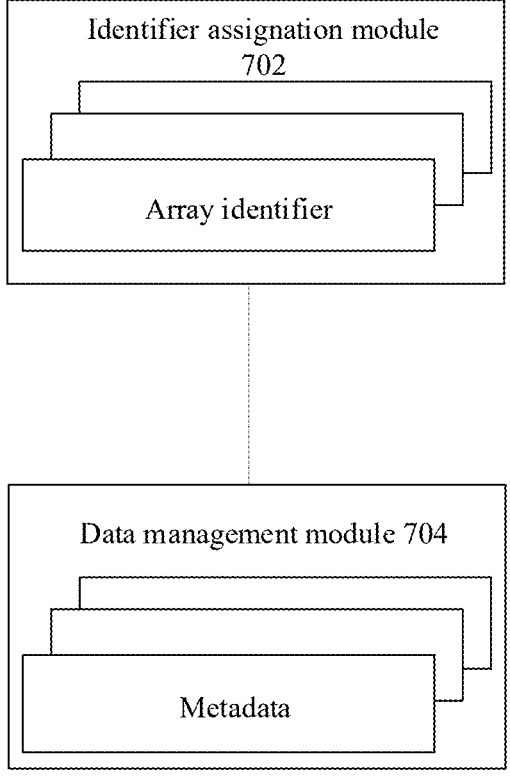
FIG. 7 is a schematic structural diagram of a data processing apparatus provided in an embodiment of the present specification.

Corresponding to the above method embodiments, the present specification also provides data processing apparatus embodiments. FIG. 7 shows a schematic structural diagram of a data processing apparatus provided in an embodiment of the present specification. As shown in FIG. 7, the apparatus is applied to a metadata management node in a distributed file system, including:

an identifier assignation module 702, configured for determining a directory level of a metadata to be processed in a directory tree, and assigning an array identifier to the metadata to be processed based on the directory level; and a data management module 704, configured for constructing a metadata management table corresponding to the metadata to be processed based on the array identifier and metadata in the directory tree, and managing the directory tree based on the metadata management table.

Optionally, the identifier assignation module 702 is further configured for:

determining a field level of the metadata to be processed based on the directory level, and assigning the array identifier for the metadata to be processed based on the field level and a preset array field.

Optionally, the identifier assignation module 702 is further configured for:

determining a total number of bytes of the preset array field, and determining a number of level bytes corresponding to the field level based on the total number of bytes; and abbreviating the array identifier based on the number of level bytes to obtain an abbreviated array identifier of the array identifier.

Optionally, the data management module 704 is further configured for:

determining metadata of the same data type as the metadata to be processed from the metadata in the directory tree; and constructing the metadata management table corresponding to the metadata to be processed based on the array identifier and the metadata of the same data type.

Optionally, the data management module 704 is further configured for:

in a case where it is determined that data in the metadata management table meets a preset splitting condition, splitting the metadata management table based on the array identifier, and segmenting the directory tree where the metadata to be processed is located based on a split result.

Optionally, the data management module 704 is further configured for:

receiving a splitting execution instruction for the metadata management table, in response to the splitting execution instruction, splitting the metadata management table based on the array identifier, and segmenting the directory tree where the metadata to be processed is located based on a split result.

Optionally, the apparatus further includes:

a data assignation module, configured for determining a segmentation array identifier of the directory tree; and assigning all sub-directory trees under the segmentation array identifier to another management node, except the metadata management node, in the distributed file system for management.

Optionally, the data management module 704 is further configured for:

receiving a directory move instruction for a sub-directory tree under the array identifier; and in response to the directory move instruction, moving the sub-directory tree to a target array position carried in the directory move instruction, wherein a management node corresponding to the target array position is different from the management node corresponding to the sub-directory tree.

Optionally, the data management module 704 is further configured for:

updating the metadata management table based on a move result, wherein the array identifier in the move result remains unchanged during update process.

The data processing apparatus provided in the embodiments of the present specification introduces the concept of array identifiers by assigning a corresponding data identifier to metadata based on a directory level of the metadata in a directory tree in a management node of a distributed file system, and then constructing a metadata management table and the directory tree according to the data identifier to realize the management of the metadata. In the process of performing operations on the metadata, the metadata management table and the directory tree are divided through the data identifier, which can efficiently realize the management of the metadata. At the same time, in the process of modifying the metadata, the array identifier may also be used to determine a directory tree that needs to be modified, thereby enabling flexible modification and adjustment of the directory tree, and also improving the metadata management efficiency of the entire distributed file system.

The above is a schematic scheme of a data processing apparatus of the present embodiment. It should be noted that the technical solution of the data processing apparatus and the technical solution of the above data processing method belong to the same concept. For details not described in detail in the technical solution of the data processing apparatus, please refer to the description of the technical solution of the above data processing method.

Figure 8:
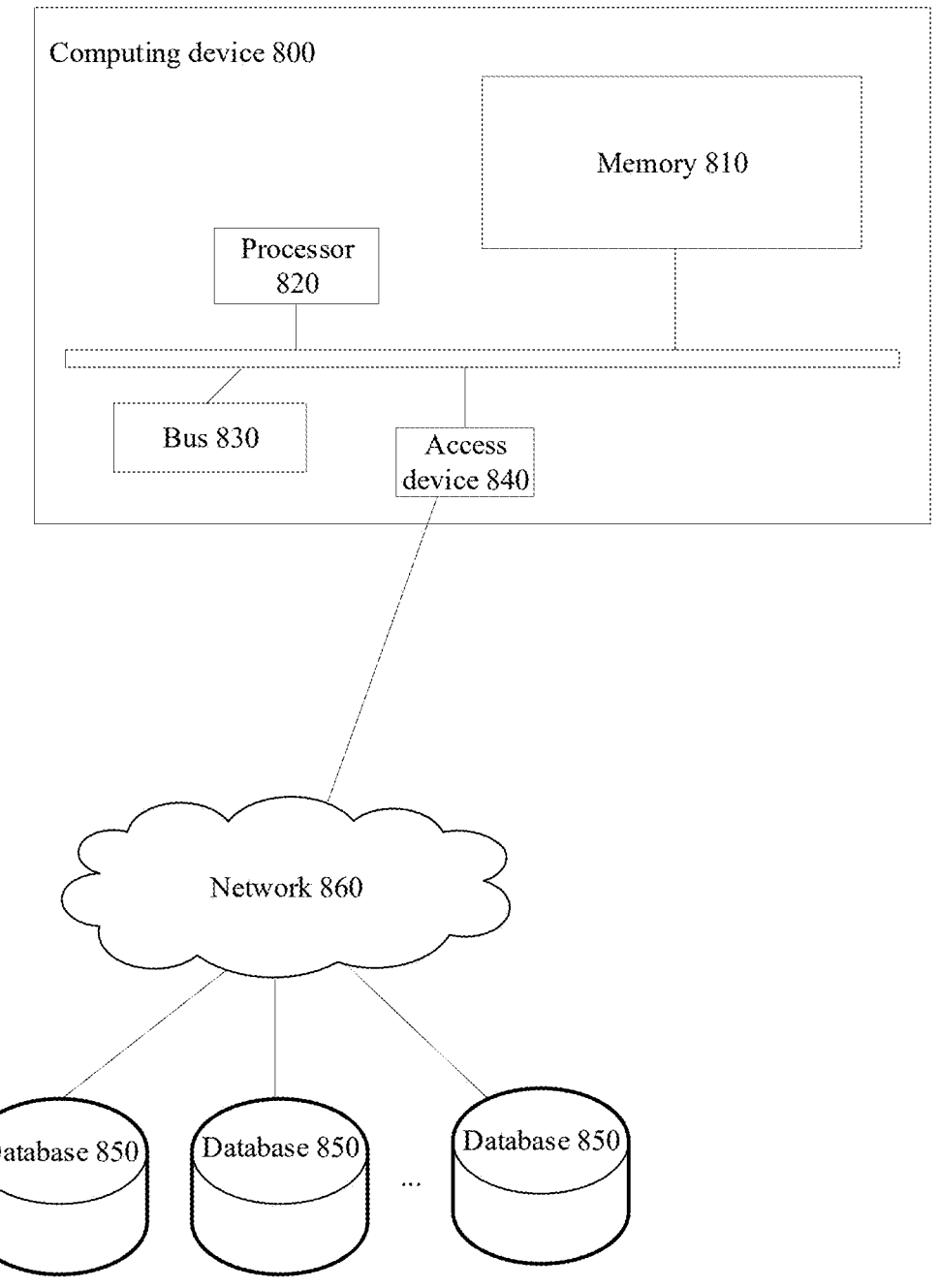
FIG. 8 is a block diagram of a structure of a computing device provided in an embodiment of the present specification.

FIG. 8 shows a structural block diagram of a computing device 800 provided according to an embodiment of the present specification. Components of the computing device 800 include, but are not limited to, a memory 810 and a processor 820. The processor 820 is connected to the memory 810 via a bus 830, and the database 850 is used to store data.

Computing device 800 also includes an access device 840 that enables the computing device 800 to communicate via one or more networks 860. Examples of these networks include the Public Switched Telephone Network (PSTN), a Local Area Network (LAN), a Wide Area Network (WAN), a Personal Area Network (PAN), or a combination of communication networks such as the Internet. The access device 840 may include one or more of any type of network interface (e.g., a network interface card (NIC)) whether wired or wireless, such as an IEEE 802.11 wireless local area network (WLAN) wireless interface, a Worldwide Interoperability for Microwave Access (Wi-MAX) interface, an Ethernet interface, a Universal Serial Bus (USB) interface, a cellular network interface, a Bluetooth interface, a Near Field Communication (NFC) interface, and the like.

In an embodiment of the present specification, the above-mentioned components of the computing device 800 and other components not shown in FIG. 8 may also be connected to each other, for example, via a bus. It should be understood that the block diagram of the structure of the computing device shown in FIG. 8 is for illustrative purposes only and is not intended to limit the scope of the present specification. Those skilled in the art may add or replace other components as needed.

The computing device 800 may be any type of stationary or mobile computing device, including a mobile computer or mobile computing device (e.g., a tablet computer, a personal digital assistant, a laptop computer, a notebook computer, a netbook computer, etc.), a mobile phone (e.g., a smartphone), a wearable computing device (e.g., a smart watch, smart glasses, etc.), or other type of mobile device, or a stationary computing device such as a desktop computer or PC. The computing device 800 may also be a mobile or stationary server.

The processor 820 is used to execute the following computer executable instructions which, when executed by the processor, implement steps of the above data processing method.

The above is a schematic scheme of a computing device of the present embodiment. It should be noted that the technical solution of the computing device and the technical solution of the above data processing method belong to the same concept. For details not described in detail in the technical solution of the computing device, please refer to the description of the technical solution of the above data processing method.

An embodiment of the present specification further provides a computer-readable storage medium having computer-executable instructions stored thereon which, when executed by a processor, implement steps of the above data processing method.

The above is a schematic scheme of a computer-readable storage medium of the present embodiment. It should be noted that the technical solution of the storage medium and the technical solution of the above data processing method belong to the same concept. For details not described in detail in the technical solution of the storage medium, please refer to the description of the technical solution of the above data processing method.

An embodiment of the present specification further provides a computer program, wherein the computer program, when executed in a computer, causes the computer to perform steps of the above data processing method.

The above is an illustrative solution of a computer program of the present embodiment. It should be noted that the technical solution of the computer program and the technical solution of the above data processing method belong to the same concept. For details not described in detail in the technical solution of the computer program, please refer to the description of the technical solution of the above data processing method.

The above describes particular embodiments of the present specification. Other embodiments are within the scope of the following claims. In some cases, the actions or steps recited in the claims may be performed in an order different from that in the embodiments and still achieve desirable results. In addition, the processes depicted in the accompanying figures do not necessarily require the particular order shown, or sequential order, to achieve desirable results. In certain implementations, multitasking and parallel processing are also possible or may be advantageous.

The computer instructions include computer program codes, which may be in source code form, object code form, executable file, or some intermediate form. The computer-readable medium may include: any entity or apparatus capable of carrying the computer program codes, a recording medium, a USB flash drive, a mobile hard disk, magnetic disk, an optical disk, a computer memory, a read-only memory (ROM), a random-access memory (RAM), an electrical carrier signal, a telecommunication signal and a software distribution medium, etc. It should be noted that the content contained in the computer-readable medium may be appropriately increased or decreased according to the requirements of legislation and patent practice in the jurisdiction. For example, in some jurisdictions, according to legislation and patent practice, the computer-readable medium does not include electrical carrier signals and telecommunication signals.

It should be noted that, for the sake of convenience in description, the aforementioned method embodiments are all expressed as a combination of a series of actions, but those skilled in the art should be aware that the embodiments of the present specification are not limited to the described order of actions, because according to the embodiments of the present specification, certain steps may be performed in other orders or simultaneously. Secondly, those skilled in the art should also be aware that the embodiments described in the present specification are all preferred embodiments, and the actions and modules involved are not necessarily required by the embodiments of the present specification.

In the above embodiments, the description of each embodiment has its own emphasis. For parts that are not described in detail in a certain embodiment, reference may be made to the relevant descriptions of other embodiments.

The preferred embodiments of the present specification disclosed above are only used to help explain the present specification. The optional embodiments do not describe all details exhaustively nor limit the invention to the particular embodiments described. Obviously, many modifications and variations may be made based on the contents of the embodiments of the present specification. The present specification selects and specifically describes these embodiments in order to better explain the principles and practical applications of the embodiments of the present specification, so that those skilled in the art can well understand and use the present specification. The present specification is limited only by the claims appended hereto along with their full scope and equivalents.

What is claimed is:

1. A data processing method for improving metadata management and directory tree partitioning in a distributed file system, applied to a metadata management node in the distributed file system, comprising:

determining a directory level of metadata to be processed in a directory tree, and assigning an array identifier to the metadata to be processed based on the directory level, wherein the array identifier is an identifier corresponding to a node of the directory level in the directory tree;

constructing a metadata management table corresponding to the metadata to be processed based on the array identifier and metadata in the directory tree, wherein the array identifier is used as a key value in the metadata management table and is a prefix of a primary key for metadata records in the metadata management table; and managing the directory tree based on the metadata management table, wherein the directory tree is represented as a B+ tree organized according to the array identifier, and managing the directory tree comprises, in a case where it is determined that data in the metadata management table meets a preset splitting condition, splitting the metadata management table based on the array identifier, and segmenting, based on a split result, the directory tree where the metadata to be processed is located;

wherein the method further comprises:

determining a field level of the metadata based on the directory level, and assigning the array identifier to the metadata based on the field level and a preset array field;

determining a total number of bytes of the preset array field, and determining a number of level bytes corresponding to the field level based on the total number of bytes; and abbreviating the array identifier based on the number of level bytes to obtain an abbreviated array identifier of the array identifier.

2. The data processing method as claimed in claim 1, wherein constructing the metadata management table corresponding to the metadata based on the array identifier and the metadata in the directory tree comprises:

determining, from the metadata in the directory tree, metadata having the same data type as the metadata; and constructing the metadata management table corresponding to the metadata based on the array identifier and the metadata having the same data type.

3. The data processing method as claimed in claim 1, wherein managing the directory tree based on the metadata management table further comprises:

receiving a splitting execution instruction for the metadata management table, and in response to the splitting execution instruction, splitting the metadata management table based on the array identifier, and segmenting, based on a split result, the directory tree where the metadata is located.

4. The data processing method as claimed in claim 1, wherein after segmenting, based on the split result, the directory tree where the metadata is located, the method further comprises:

determining a segmentation array identifier of the directory tree;

assigning all sub-directory trees under the segmentation array identifier to another management node, except the metadata management node, in the distributed file system for management.

5. The data processing method as claimed in claim 1, wherein managing the directory tree based on the metadata management table further comprises:

receiving a directory move instruction for a sub-directory tree under the array identifier; and in response to the directory move instruction, moving the sub-directory tree to a target array position carried in the directory move instruction, wherein a management node corresponding to the target array position is different from a management node corresponding to the sub-directory tree.

6. The data processing method as claimed in claim 5, wherein after moving the sub-directory tree to the target array position carried in the directory move instruction, the method further comprises:

updating the metadata management table based on a move result, wherein the array identifier in the move result remains unchanged during update process.

7. A non-transitory computer-readable storage medium for improving metadata management and directory tree partitioning in a distributed file system, having computer-executable instructions stored thereon which, when executed by a processor, implement steps of the data processing method for improving metadata management and directory tree partitioning in a distributed file system as claimed in claim 1.

8. The non-transitory computer-readable storage medium as claimed in claim 7, wherein the computer-executable instructions, when executed by the processor, implement steps of a data processing method for improving metadata management and directory tree partitioning, applied to a metadata management node in a distributed file system, comprising:

determining a directory level of metadata to be processed in a directory tree, and assigning an array identifier to the metadata to be processed based on the directory level; and constructing a metadata management table corresponding to the metadata to be processed based on the array identifier and metadata in the directory tree, and managing the directory tree based on the metadata management table, wherein the array identifier is used as a key value in the metadata management table and is a prefix of a primary key for metadata records in the metadata management table, wherein the directory tree is represented as a B+ tree organized according to the array identifier, and wherein assigning the array identifier to the metadata to be processed based on the directory level comprises:

determining a field level of the metadata to be processed based on the directory level, and assigning the array identifier to the metadata to be processed based on the field level and a preset array field.

9. The data processing method as claimed in claim 1, further comprising, in response to a file system operation for the metadata to be processed:

receiving, at the metadata management node, an operation handle that includes the array identifier;

determining, based on the array identifier in the operation handle and a scheduling status of partitions of the metadata management table, a metadata management node among a plurality of metadata management nodes in the distributed file system that manages a directory subtree corresponding to the array identifier; and processing the file system operation at the determined metadata management node without a distributed transaction across multiple metadata management nodes.

10. The non-transitory computer-readable storage medium as claimed in claim 8, wherein the computer-executable instructions, when executed by the processor, further implement the steps of the data processing method as claimed in claim 9.

11. A computing device for improving metadata management and directory tree partitioning in a distributed file system, comprising:

a memory and a processor;

wherein the memory is used to store computer-executable instructions, and the processor is used to execute the computer-executable instructions to perform operations of:

determining a directory level of metadata to be processed in a directory tree, and assigning an array identifier to the metadata to be processed based on the directory level, wherein the array identifier is an identifier corresponding to a node of the directory level in the directory tree; and constructing a metadata management table corresponding to the metadata to be processed based on the array identifier and metadata in the directory tree, wherein the array identifier is used as a key value in the metadata management table and is a prefix of a primary key for metadata records in the metadata management table, and managing the directory tree based on the metadata management table, wherein the directory tree is represented as a B+ tree organized according to the array identifier, and managing the directory tree comprises, in a case where it is determined that data in the metadata management table meets a preset splitting condition, splitting the metadata management table based on the array identifier, and segmenting, based on a split result, the directory tree where the metadata to be processed is located;

determining a field level of the metadata based on the directory level, and assigning the array identifier to the metadata based on the field level and a preset array field;

determining a total number of bytes of the preset array field, and determining a number of level bytes corresponding to the field level based on the total number of bytes; and abbreviating the array identifier based on the number of level bytes to obtain an abbreviated array identifier of the array identifier.

12. The computing device as claimed in claim 11, wherein the processor executes the computer-executable instructions to perform operations of:

determining, from the metadata in the directory tree, metadata having the same data type as the metadata to be processed; and constructing the metadata management table correspond-
ing to the metadata to be processed based on the array
identifier and the metadata having the same data type.

13. The computing device as claimed in claim 11, wherein
the processor executes the computer-executable instructions
to perform operations of:

receiving a splitting execution instruction for the metadata
management table, in response to the splitting execu-
tion instruction, splitting the metadata management
table based on the array identifier, and segmenting the
directory tree where the metadata to be processed is
located based on a split result.

14. The computing device as claimed in claim 11, wherein
the processor executes the computer-executable instructions
to perform operations of:

determining a segmentation array identifier of the direc-
tory tree;

assigning all sub-directory trees under the segmentation
array identifier to another management node, except the
metadata management node, in the distributed file
system for management.

15. The computing device as claimed in claim 11, wherein
the processor executes the computer-executable instructions
to perform operations of:

receiving a directory move instruction for a sub-directory
tree under the array identifier; and in response to the directory move instruction, moving the
sub-directory tree to a target array position carried in the directory move instruction, wherein a management
node corresponding to the target array position is
different from the management node corresponding to
the sub-directory tree.

16. The computing device as claimed in claim 15, wherein
the processor executes the computer-executable instructions
to perform operations of:

updating the metadata management table based on a move
result, wherein the array identifier in the move result
remains unchanged during update process.

17. The computing device as claimed in claim 11, wherein
the processor executes the computer-executable instructions
to perform operations further comprising:

receiving a file system operation handle that includes the
array identifier;

determining, based on the array identifier in the file
system operation handle and a scheduling status of
partitions of the metadata management table, a meta-
data management node among a plurality of metadata
management nodes in the distributed file system that
manages a directory subtree corresponding to the array
identifier; and processing the file system operation at the determined
metadata management node without a distributed trans-
action across multiple metadata management nodes.

* * * * *